United States Patent
Carlson et al.

(10) Patent No.: US 6,298,070 B1
(45) Date of Patent: Oct. 2, 2001

(54) PACKET TRAINING WITH AN ADJUSTABLE OPTIMUM NUMBER OF PACKETS

(75) Inventors: David Glenn Carlson; Lee Anton Sendelbach, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/074,434

(22) Filed: May 7, 1998

(51) Int. Cl.[7] ........................................................ H04J 3/16

(52) U.S. Cl. ........................................... 370/465; 370/468

(58) Field of Search .................................... 370/389, 296, 370/401, 465, 468–470, 473, 447–450, 232, 253, 386; 714/11, 10, 23–25, 43–44; 375/147, 133

(56) References Cited

U.S. PATENT DOCUMENTS

| | | | |
|---|---|---|---|
| 4,517,641 | 5/1985 | Pinheiro | 364/200 |
| 4,736,369 | 4/1988 | Barzilai et al. | 370/94 |
| 4,805,167 | 2/1989 | Leslie et al. | 370/84 |
| 4,979,184 | 12/1990 | Bottoms et al. | 375/13 |
| 5,040,176 | 8/1991 | Barzilai et al. | 370/94.1 |
| 5,063,562 | 11/1991 | Barzilai et al. | 370/94.1 |
| 5,127,051 | 6/1992 | Chan et al. | 380/49 |
| 5,166,930 | 11/1992 | Braff et al. | 370/94.1 |
| 5,179,660 | 1/1993 | Devany et al. | 395/200 |
| 5,199,028 | 3/1993 | Arnold | 370/60 |
| 5,260,942 | 11/1993 | Auerbach et al. | 370/94.1 |
| 5,285,442 | 2/1994 | Iwamura et al. | 370/17 |
| 5,343,465 | * 8/1994 | Khalil | 370/232 |
| 5,400,328 | 3/1995 | Burren et al. | 370/79 |

(List continued on next page.)

FOREIGN PATENT DOCUMENTS 7066837  3/1995  (JP) ............................ H04L/012/56

OTHER PUBLICATIONS

"TCP Vegas: New Tehniques for Congestion Detection and Avoidance", Lawrence S. Brakmo, Sean W. O'Malley, and Larry L. Peterson, Dept. of Computer Science, Univ.of Arizona, Tucson, AZ 85721, pp. 24–35.

(List continued on next page.)

Primary Examiner—Huy D. Vu
Assistant Examiner—Prenell Jones
(74) Attorney, Agent, or Firm—Owen J. Gamon; Matthew J. Bussan

(57) ABSTRACT

A mechanism that dynamically adjusts the number of packets sent in a train from a node to reflect the rate-of-packets arriving at a node in a network. In the preferred embodiment, the node has a packet controller that determines the optimum number-of-packetsito send in the train. The node also has a timer interval, which is the maximum time-to wait before sending the next train. The packet controller samples the packet arrival-rate and calculates the elapsed time to receive a configurable-constant number-of-packets in a train. This elapsed time is referred to as a sampling interval. The packet controller only calibrates the optimum number-of-packets when the sampling interval changes significantly from the historic sampling-interval. A significant change is a predetermined percentage greater or less than the historic interval-time. When the timer interval expires (referred to as a timeout), the packet controller sets the optimum number-of-packets to be the number-of-packets accumulated prior to the timeout, which lets the packet arrival-rate determine the number of packets that should be trained. Furthermore, timeouts occurring without a corresponding increase in the optimum number-of-packets cause the packet controller to first lower the optimum number-of-packets by a small amount, and then on back-to-back timeouts without a received packet, the packet controller causes more drastic to drops in the optimum number-of-packets down to the current number-of-packets accumulated prior to the timeout. This timeout processing rides out small changes in the packet arrival-rate.

27 Claims, 10 Drawing Sheets

U.S. PATENT DOCUMENTS

| | | | |
|---|---|---|---|
| 5,402,416 | 3/1995 | Cieslak et al. | 370/60 |
| 5,537,438 | 7/1996 | Mourot et al. | 375/231 |
| 5,566,208 | 10/1996 | Balakrishnan | 375/240 |
| 5,606,580 | 2/1997 | Mourot et al. | 375/340 |
| 5,859,853 * | 1/1999 | Carlson | 370/468 |

OTHER PUBLICATIONS

"Delay Analysis For Packet Trains Over Computer Communication Networks", Ihab A. Jacobs, and Eric B. Hall, Dept. of Electrical Engineering, Southern Methodist University, Dallas, Texas 75275, pp. 13–7 –13–14.

Patent application Ser. No. 08/283,889, Filed Aug. 01, 1994, "Method and Apparatus For Grouping Packets Using Timed Windows", Brad L. Brech, Gary S. Delp and Albert A. Slane.

Patent application Ser. No. 08/472,368, filed Jun. 07, 1995, "Method and System For Enhanced Communication In A Multisession Packet Based Communication System", Gary S. Delp and Albert A. Slane.

Patent application Ser. No. 08/670,795, filed Jun. 21, 1996, "Adaptive Packet Training", David Glenn and Lee Sendelbach.

Article entitled "Efficient Data Transmission in Remote Operation System By Intentional Transmission Delay", IBM Technical Disclosure Bulletin, vol. 37, No. 08, Aug. 1994.

* cited by examiner

PACKET TRAINING WITH AN ADJUSTABLE OPTIMUM NUMBER OF PACKETS

FIELD OF THE INVENTION

This invention relates to the data processing field. More particularly, this invention relates to a method and apparatus for adaptively transmitting data packets in a train.

BACKGROUND

Computer networks that facilitate data processing are becoming increasingly common. Such networks include multiple nodes, which are typically computers, that may be distributed over vast distances and connected by communications links, such as telephone wires. Nodes communicate with each other using packets, which are the basic units of information transfer. A packet contains data surrounded by control and routing information supplied by the various nodes.

Sending, receiving, and processing of packets have an overhead, or associated cost. That is, it takes time to receive a packet at a node, to examine the packet's control information, and to determine the next action. One way to reduce the packet overhead is a method called packet training. This packet-training method consolidates individual packets into a group, called a train, so that a node can process the entire train of packets at once. The word "train" comes from a train of railroad cars. It is less expensive to form a train of railroad cars pulled by a single locomotive than it is to give each railroad car its own locomotive. Analogously, processing a train of packets has less overhead, and thus better performance, than processing each packet individually.

In a typical training method, a node will accumulate packets until the train reaches a fixed target-length. Then the node will process or retransmit the entire thin at once. In order to ensure that the accumulated packets are eventually handled since the packet arrival rate at the node is unpredictable, the method will start a timer wizen the node receives the train's first packet. When the timer expires, the node will end the train and process it even if train has not reached its target length.

This training method works well in times of heavy packet-traffic because the timer never expires. But in times of light packet-traffic, the packets that the node accumulates experience poor performance while waiting in vain for additional packets to arrive, and the ultimate timer expiration introduces additional processing overhead.

Thus, there is a need for a packet-training mechanism that will overcome the disadvantages of the prior art and provide improved performance even in times of a light, variable, or unpredictable packet-traffic rate.

SUMMARY OF THE INVENTION

The invention dynamically adjusts the number of packets sent in a train from a node to reflect the rate-of-packets arriving at a node in a network. In the preferred embodiment, the node has a packet controller that determines the opium train-length, that is the optimum number-of-packets to send in a train. The node also has a timer interval, which is the maximum time-to-wait before sending the next train. The packet controller samples the packet arrival-rate and calculates the elapsed time to receive a configurable-constant number-of-packets in a train. This elapsed time is referred to as a sampling interval. The packet controller only calibrates the optimum train-length when the sampling interval changes significantly from the historic sampling-interval. A significant change is a predetermined percentage greater or less than the historic sampling-interval.

When the timer interval expires (referred to as a timeout), the packet controller sets the optimum train-length to be the number-of-packets accumulated prior to the timeout, which lets the packet arrival-rate determine the number of packets that should be trained. Furthermore, timeouts occurring without a corresponding increase in the optimum train-length cause the packet controller to first lower the optimum train-length by a small amount, and then on back-to-back timeouts without a received packet, the packet controller causes more drastic drops in the optimum train-lengths down to the current number-of-packets accumulated prior to the timeout. This timeout processing rides out small changes in the packet arrival-rate.

DESCRIPTION OF THE PREFERRED EMBODIMENT

Technology Overview

Figure 1:
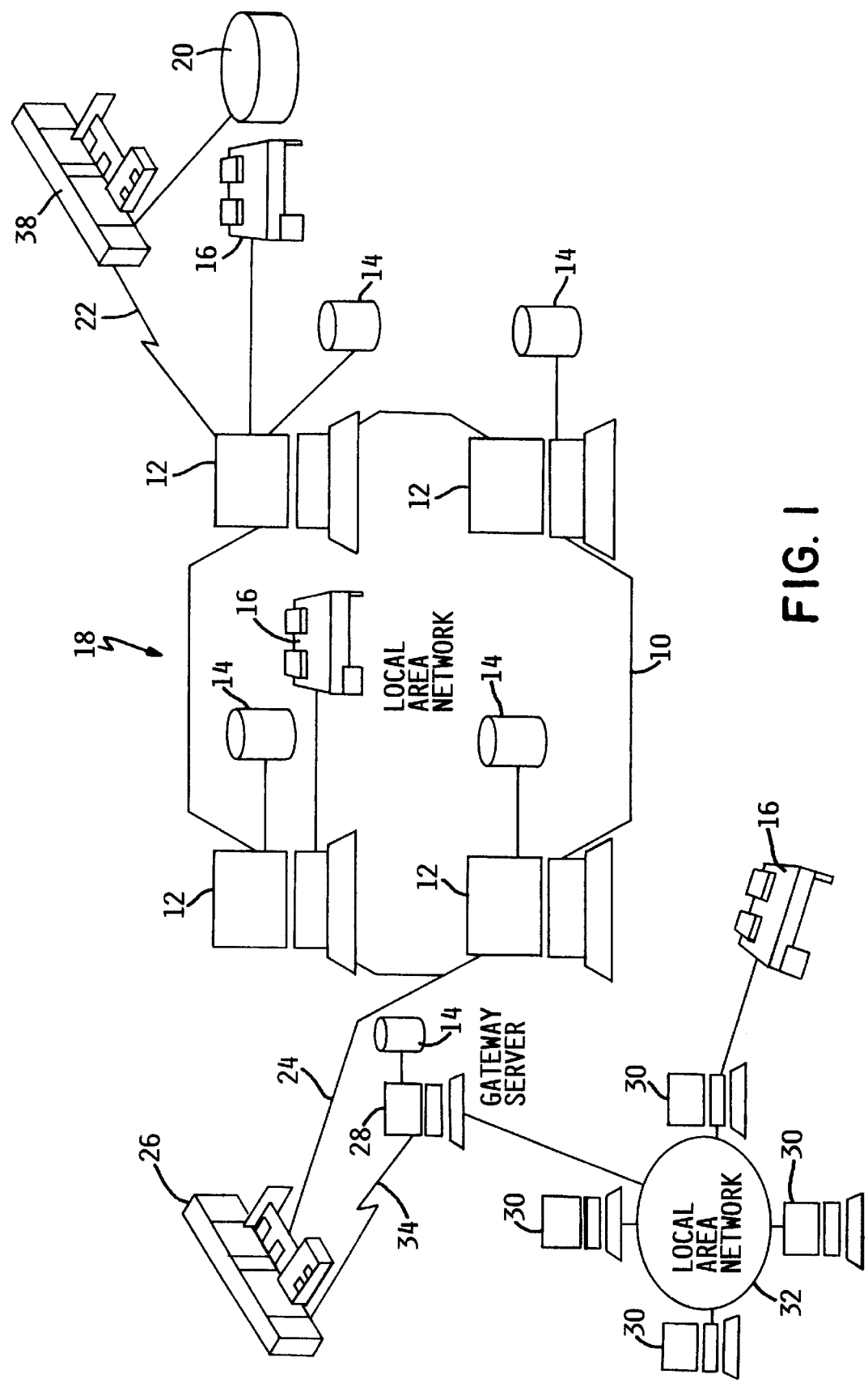
FIG. 1 depicts a pictorial representation of a network of exemplary data processing systems that may be used to implement a preferred embodiment.

Computer networks that facilitate data processing are becoming increasingly common. Such networks include multiple nodes, which are typically computers, that may be distributed over vast distances and connected by communications links, such as telephone wires. Each node typically includes a processing element, which processes data, and a communications-control unit, which controls the transmission and reception of data in the network across the communications link. The processing element can include one or more processors and memory.

Nodes communicate with each other using packets, which are the basic units of information transfer. A packet contains data surrounded by control and routing information supplied by the various nodes in the network. A message from one node to another may be sent via a single packet, or the node can break the message up into several shorter packets with each packet containing a portion of the message. The communications-control unit at a node receives a packet from the communications link and sends the packet to the node's processing element for processing. Likewise, a node's processing element sends a packet to the node's communications-control unit, which transmits the packet across the network.

All of this sending, receiving, and processing of packets has an overhead, or cost, associated with it. That is, it takes time to receive a packet at a node, to examine the packet's control information, and to determine what to do next with the packet. One way to reduce the packet overhead is a method, called packet-training. This packet-training method consolidates individual packets into a group, called a train, which reduces the overhead when compared to processing the same number of packets individually because a node can process the entire train of packets at once. The word "train" comes from a train of railroad cars. It is less expensive to form a train of railroad cars pulled by a single locomotive than it is to give each railroads car its own locomotive. Analogously, processing a train of packets has less overhead than processing each packet individually.

Detailed Description

The invention dynamically adjusts the number of packets sent in a train from a node to reflect the rate-of-packets arriving at a node in a network. The network could have computer systems as its nodes, or the network could have processors in a multi-processor system as its nodes, or the network could be a combination of processors and computer systems.

In the preferred embodiment, the node has a packet controller that determines the optimum number-of-packets to send in a train. The node also has a timer interval, which is the um time-to-wait before sending the next train. The packet controller samples the packet arrival-rate and calculates the elapsed time to receive a configurable-constant number-of-packets in a train. This elapsed time is referred to as a sampling interval. Thus, when the packet arrival-rate is high, the sampling interval is short, and when the packet arrival-rate is low, the sampling interval is long. The packet controller only calibrates the optimum number-of-packets when the sampling interval changes significantly from the historic sampling-interval. A significant change is a predetermined percentage greater or less than the historic sampling-interval.

When the timer interval expires (referred to as a timeout), the packet controller sets the optimum number-of-packets to be the number-of-packets accumulated prior to the timeout, which lets the packet arrival-rate determine the number of packets that should be trained. Furthermore, timeouts occurring without a corresponding increase in the optimum number-of-packets cause the packet controller to first lower the optimum number-of-packets by a small amount, and then on back-to-back timeouts without receiving a new packet, the packet controller causes more drastic drops in the optimum number-of-packets down to the current number-of-packets accumulated prior to the timeout. This timeout processing rides out small changes in the packet arrival-rate.

It might be instructive to think of the ebb and flow of the packet arrival-rate as waves, with the packet controller attempting to stay with the current wave by retaining the current optimum number-of-packets sent in the train. The packet controller desires to ride out small changes in the current wave. But, a significant change in the packet arrival-rate means that a new wave has formed, so the packet controller moves to the new wave by calibrating the optimum number-of-packets sent in the train.

With reference now to the figures, and in particular with reference to FIG. 1, a pictorial representation of network 18 is depicted, which may be utilized to implement a method and apparatus of the preferred embodiment. Network 18 may include a plurality of networks, such as local area networks (LAN) 10 and 32, each of which includes a plurality of individual computers 12 and 30, respectively. Computers 12 and 30 may be implemented utilizing any suitable computer, such as the PS/2 computer, AS/400 computer, or a RISC System/6000 computer, which are products of IBM Corporation located in Annonk, New York. "PS/2", "AS/400", and "RISC System/6000" are trademarks of IBM Corporation. A plurality of intelligent work stations (IWS) coupled to a host processor may also be utilized in such a network.

Each individual computer may be coupled to storage device 14 and/or an output device 16, such as a printer. One or more storage devices 14 may be utilized to store documents or resource objects that may be periodically accessed by a user within network 18. In a manner well known in the prior art, each such document or resource object stored within storage device 14 may be freely interchanged throughout network 18 by, for example, transferring a document to a user at individual computer 12 or 30.

Network 18 also may include mainframe computers, such as mainframe computer 38, which may be coupled to LAN 10 by means of communications link 22. Mainframe computer 38 may be implemented by utilizing an ESA/370 computer, an ESA/390 computer, or an AS/400 computer available from IBM Corporation. "ESA/370", "ESA/390", and "AS/400" are trademarks of IBM Corporation. Mainframe computer 38 may also be coupled to storage device 20, which may serve as remote storage for LAN 10. Similarly, LAN 10 may be coupled via communications link 24 through subsystem control-unit/communications controller 26 and communications link 34 to gateway server 28. Gateway server 28 is preferably an individual computer or IWS that serves to link LAN 32 to LAN 10.

As discussed above with respect to LAN 32 and LAN 10, a plurality of documents or resource objects may be stored within storage device 20 and controlled by mainframe computer 38, as resource manger or library service for the resource objects thus stored. Mainframe computer 38 could be located a great geographic distance from LAN 10, and similarly LAN 10 may be located a great distance from LAN 32. For example, LAN 32 might be located in California while LAN 10 might be located in Texas, and mainframe computer 38 might be located in New York.

Electronic mail, files, documents, and other information may be sent as packets between any nodes in network 18, such as individual computers 12 and 30, gateway server 28, or mainframe computer 38 through various communication links. A node is a device with which a user can access network 18. A node may be the original source of a packet, an intermediate node in the network through which the packet passes, or the ultimate destination of the packet.

Figure 2:
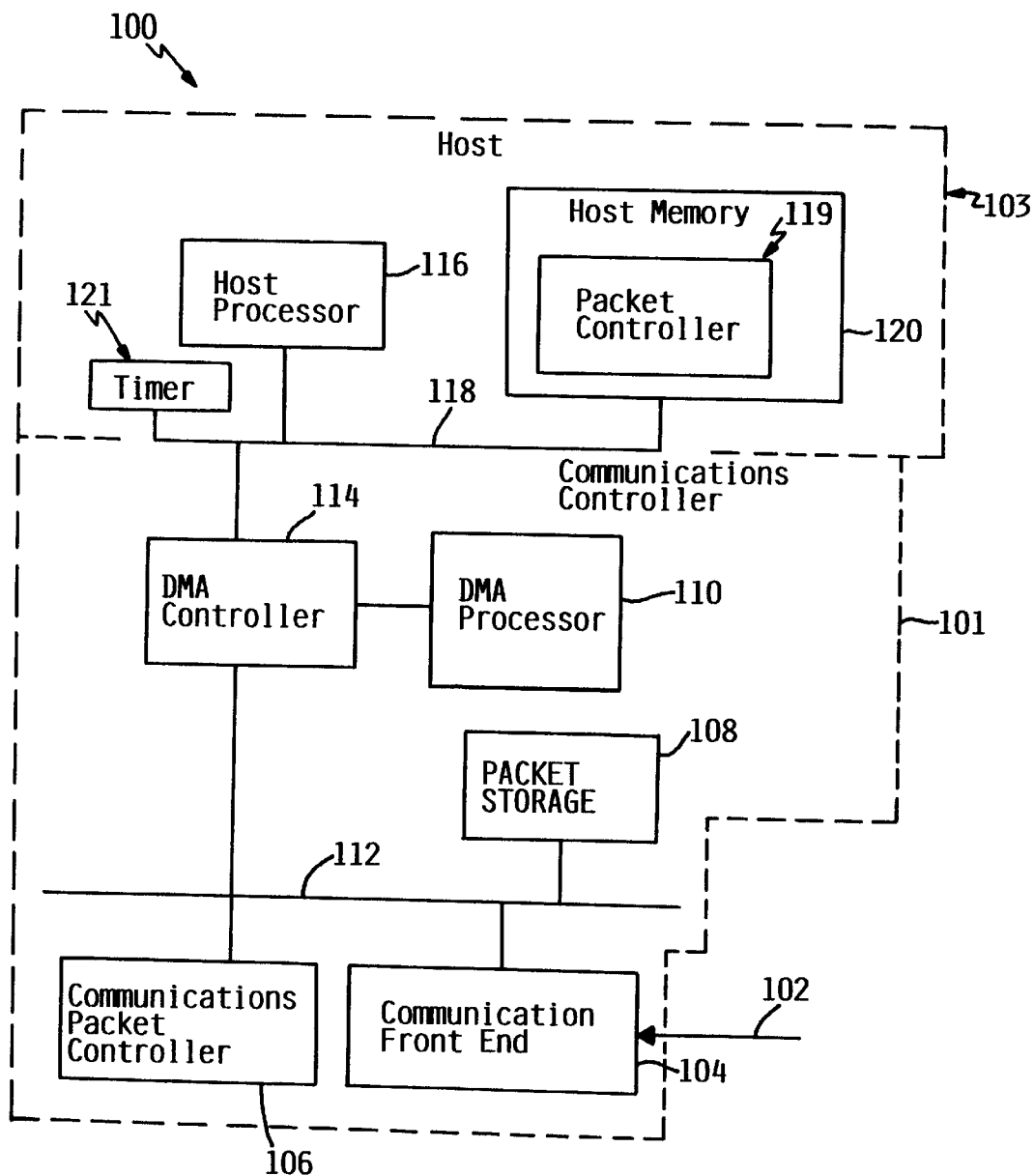
FIG. 2 depicts a schematic representation of a system that trains packets, in accordance with a preferred embodiment.

Referring to FIG. 2, a schematic representation of system 100 is shown, which may be used for training packets under a preferred embodiment of the present invention. System 100 could be implemented at any of computers 12 or 30, gateway server 28, subsystem control unit 26, or mainframe computer 38. System 100 can contain both hardware and software.

System 100 contains communications controller 101 connected to host 103 via system bus 118. System 100 is connected to network 18 of FIG. 1 via communications link 102. Communications link 102 could be any of LAN 10 or 32 or communications link 22, 24, or 34 as described in FIG. 1. Communications link 102 could be a wireless communications link.

Referring again to FIG. 2, host 103 contains host processor 116, host memory 120, and timer 121 connected via system bus 118. Host memory 120 is a random access memory sufficiently large to hold the necessary programming and data structures. While host memory 120 is shown as a single entity, memory 120 may in fact comprise a plurality of modules, and memory may exist at multiple levels, from high-speed registers and caches to lower speed but larger DRAM chips. The contents of host memory 120 can be loaded and stored from and to host processor 116's secondary storage, such as storage devices 14 or 20 of FIG. 1, as needed.

Referring again to FIG. 2, timer 121 is capable of interrupting software after expiration of a specified time. Timer 121 can be a register, such as a clock register or a time register. Setting a timer places a value in the register, and the register decrements the value with each instruction or cycle. An interrupt occurs when the register value reaches zero, which interrupts software instructions executing on CPU 116 after expiration of the specified time. Timer 121 could also be a software program that uses the clock (not shown) of host processor 116 to measure time.

Host memory 120 contains packet controller 119, which contains instructions capable of being executed by host processor 116. In the alternative, packet controller 119 could be implemented by control circuitry through the use of logic gates, programmable logic devices, or other hardware components in lieu of a processor-based system. Packet-controller 119 performs the packet-training method described herein, and its operation is further described under the description of FIGS. 5, 6, 7, and 8.

Referring again to FIG. 2, communications controller 101 contains communications front-end 104, communications packet-controller 106, packet storage 108, and DMA (Direct Memory Access) controller 114, all connected via communications bus 112. DMA controller 114 is connected to DMA processor 110.

Communications front-end 104 is connected to communications link 102 and contains the circuitry for transmitting and receiving packets across communications link 102 and is employed to communicate with other nodes in network 18.

When a packet is received by communications controller 101 from communications link 102, the packet is examined by communications packet-controller 106 and stored in packet storage 108 before being sent to DMA processor 110. DMA processor 110 controls DMA controller 114. DMA controller 114 receives packets from communications bus 112 and sends the packets to host processor 116 through system bus 118. The packets then are processed by packet controller 119 and stored in host memory 120. When host processor 116 desires to send packets to network 18, it transmits the packets from host memory 120 to packet storage 108 using DMA controller 114 and DMA processor 110. Communications packet controller 106 then uses communications front-end 104 to transmit the packets from packet storage 108 across communications link 102 to network 18.

Although a specific hardware configuration is shown in FIG. 2, a preferred embodiment of the present invention can apply to any hardware configuration that allows the training of packets, regardless of whether the hardware configuration is a complicated, multi-user computing apparatus, a single-user work station, or a network appliance that does not have non-volatile storage of its own.

Figure 3:
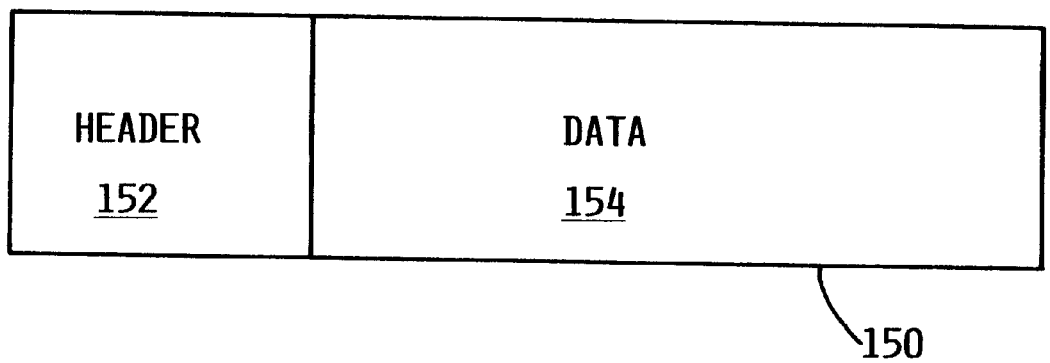
FIG. 3 depicts a data structure of an example packet, in accordance with a preferred embodiment.

Referring to FIG. 3, a data structure for packet 150 is depicted, which includes header section 152 and data section 154. Header section 152 contains control information that encapsulates data 154. For example, header section 152 might contain protocol, session, source, or destination information used for routing packet 150 through network 18. Data section 154 could contain electronic mail, files, documents, or any other information desired to be communicated through network 18. Data section 154 could also contain another entire packet, including header and data sections.

Figure 4:
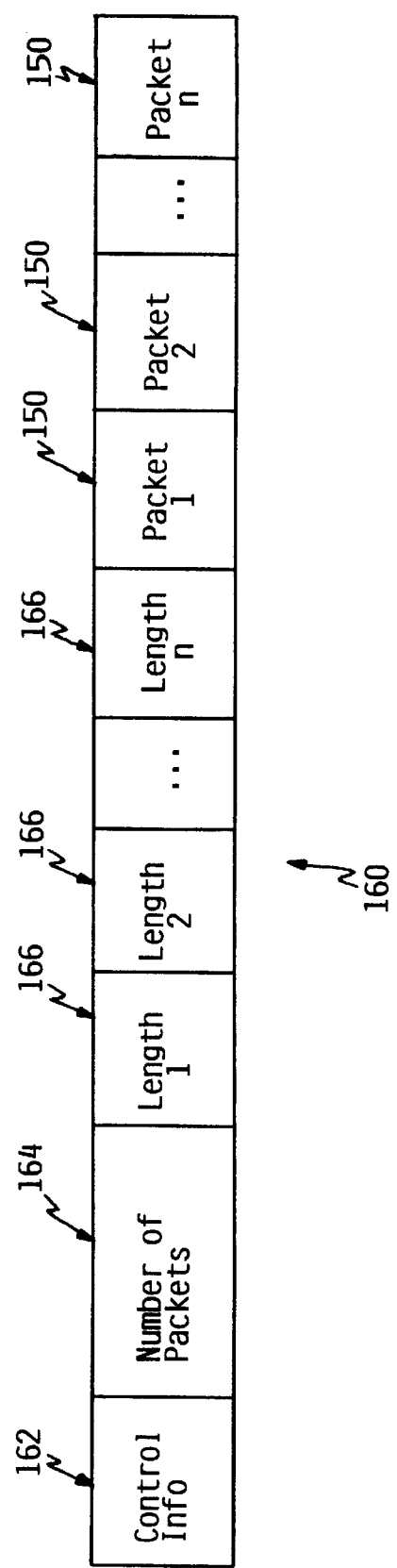
FIG. 4 depicts a data structure of an example packet train, in accordance with a preferred embodiment.

Referring to FIG. 4, a data structure example of packet train 160, according to the preferred embodiment, is depicted. Packet train 160 contains control information 162, number-of-packets 164, length 1 to length n 166, and packet 1 to packet n 150. Control information 162 can specify, among other things, that the information that follows is part of a packet train. Number-of-packets 164 indicates how many packets are in packet train 160. In this example, there are "n" packets in packet train 160. Length 1 to length n are the lengths of packet 1 to packet n, respectively. Each of packet 1 to packet n 150 can contain header and data, as shown in FIG. 3. Packet train 160 is transferred between nodes as one unit.

The operation of the preferred embodiment, as shown in the flowcharts of FIGS. 5–8, will now be described in more detail. Although packet training will be described under the description of FIGS. 5, 6, 7, and 8 as being performed by packet controller 119 in host 103 (acting as a node) as packets are sent to communications controller 101 (acting as a node), packet training can also be performed by communications packet-controller 106 as packets arrive from communications link 102 before being transmitted to host 103. Furthermore, packet training could be performed between any nodes in FIG. 1, such as node computers 12, 26, 28, 30, or 38.

Figure 5:
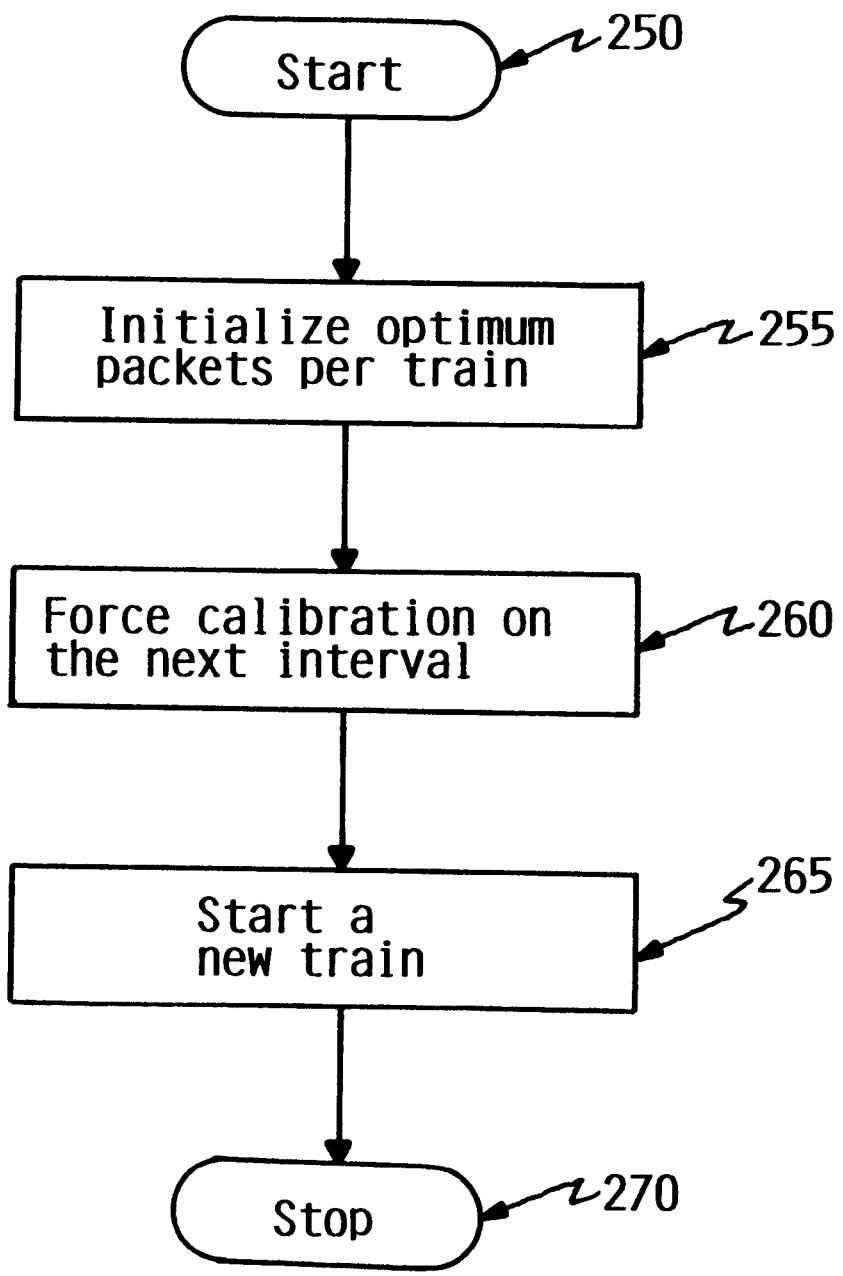
FIGS. 5, 6, 7, and 8 depict flowcharts that describe the operation of a preferred embodiment.

Referring to FIG. 5, the initialization logic for packet controller 119 is shown This logic is invoked, for example, when host 103 is powered on. At block 250, the initialization logic is entered. At block 255, packet controller 119 initializes the optimum number-of-packets per train. In the preferred embodiment, the optimum number-of-packets per train is initialized to be the minimum number-of-packets per train, but this initialization is somewhat arbitrary since there is no packet rate on which to calibrate the optimum number-of-packets per train. At block 260, packet controller 119 sets the highbound and lowbound interval-times to be 0, which will force calibration of the optimum number-of-packets in a train at the end of the first sampling-interval. At block 265, packet controller 119 initializes the new train to be ready for the first received-packet. At block 270, initialization ends.

Figure 6A:
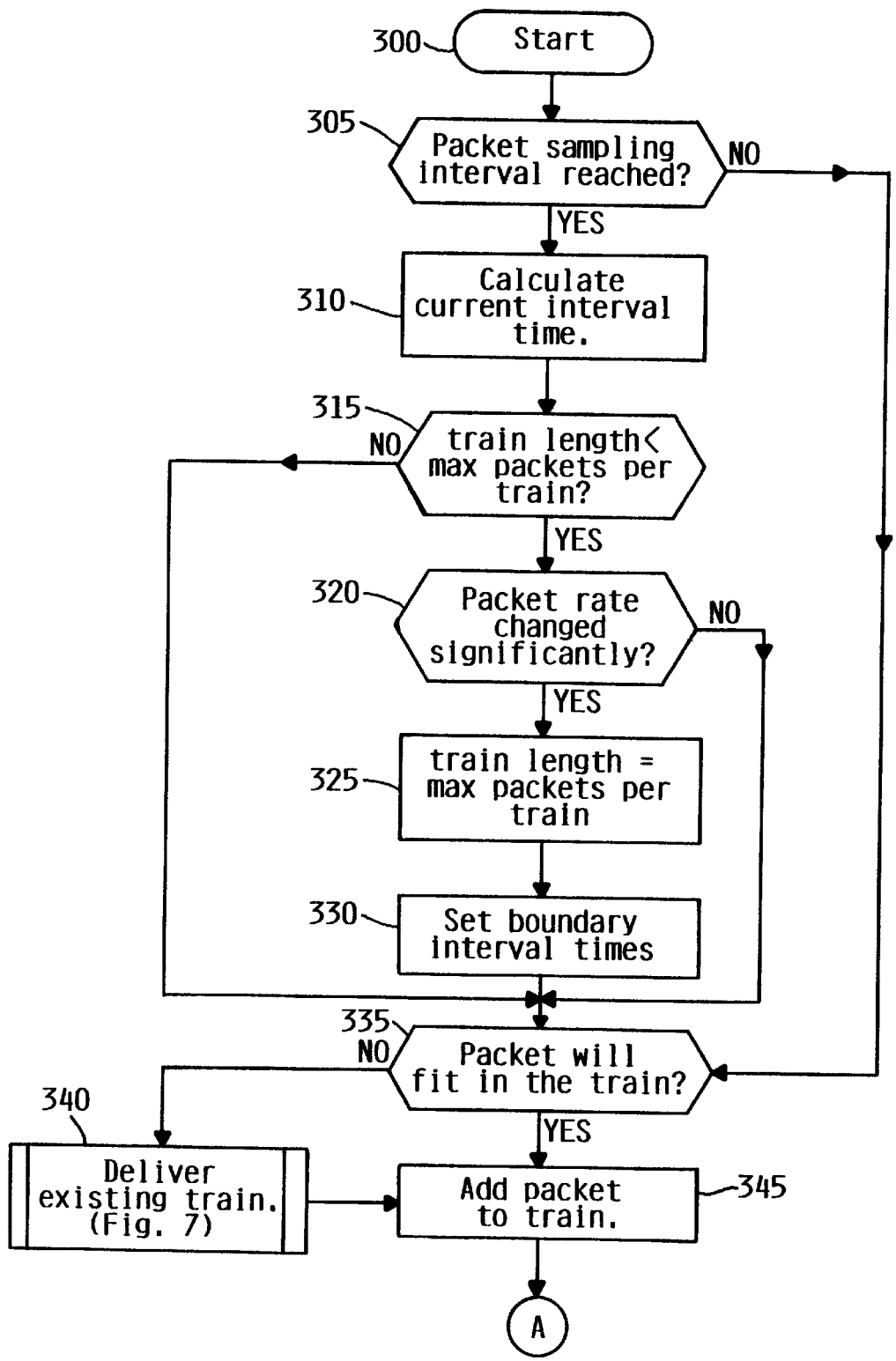
Figure 6B:
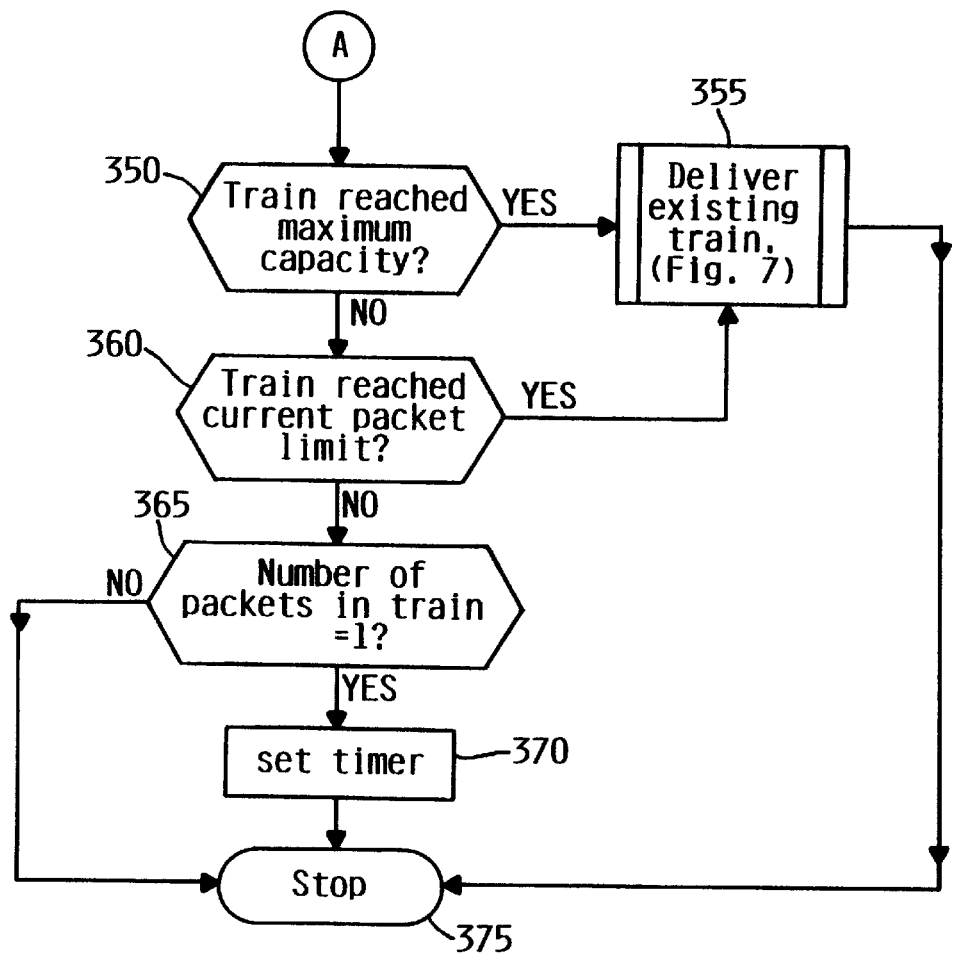

Referring to FIG. 6, the logic invoked when packet controller 119 receives a packet is shown. At block 300, the logic is started. At block 305, packet controller 119 determines whether the packet sampling-interval has been reached by comparing the count-of-packets received during the current interval to a predetermined constant representing the number-of-packets that define a sampling interval.

If the determination at block 305 is true, then control continues to block 310 where packet controller 119 calculates the current-interval time by subtracting the time that the current interval started from the current time. Control then continues to block 315 where packet controller 119 determines whether the optimum train-length is less than the maximum number-of-packets per train, which is a predetermined constant.

If the determination at block 315 is true, then control continues to block 320 where packet controller 119 determines whether the packet arrival-rate has changed significantly since the last packet-interval that caused a calibration of the optimum train-length. The comparison at block 320 is done by comparing the interval length to the highbound interval-time and to the lowbound interval-time, which were set on the last sampling-interval that the packet rate changed significantly, as further described below. The highbound interval-time and the lowbound interval-time were also set on initialization, as previously described above.

If the determination at block 320 is true, then control continues to block 325 where packet controller 119 sets the optimum train-length to be the maximum packets per-train. The optimum number-of-packets per train is set to be the maximum in order to increase the likelihood that a timeout will subsequently occur, so that the optimum number-of-packets per train can be calibrated based on the actual packet rate. Control then continues to block 330 where packet controller 119 sets the lowbound interval-time to be the interval length multiplied by the lowbound interval-delta-percentage, which is a predetermined constant Packet controller 119 also sets the highbound interval-time to be the interval time multiplied by the highbound interval-delta-percentage, which is a predetermined constant. Thus, block 330 defines what it means for the packet rate to change significantly in terms of a percentage faster or slower than the historical interval-time. Thus, packet controller 119 will adjust the optimum number-of-packets in a train only when a significant workload-rate change occurs. Control then continues to block 335, as further described below.

If the determination at block 320 is false, then control continues to block 335, as further described below.

If the determination at block 315 is false, then control continues directly to block 335, as finer described below.

If the determination at block 305 is false, then control continues directly to block 335, as further described below.

At block 335, packet controller 119 determines whether the new packet will fit in the current train. If the determination at block 335 is false, then control continues to block 340 where packet controller 119 delivers the existing train, as further described below under the description for FIG. 7. Referring again to FIG. 6, control then continues to block 345 as further described below. If the determination at block. 335 is true, then control continues directly to block 345, as further described below.

At block 345, packet controller 119 adds the new packet to the current train. Control then continues to block 350 where packet controller 119 determines whether the current train has reached its maximum capacity. This determination is done by checking the number-of-packets in the train against the maximum number-of-packets per train, which is a predetermined constant, and by checking the maximum amount-of-data per train minus the data size in the current train against the minimum packet size. If the determination at block 350 is true, then control continues to block 355 where packet controller 119 delivers the existing train, as further described below under the description for FIG. 7. Referring again to FIG. 6, control then continues to block 375 where the function stops.

If the determination at block 350 is false, then control continues to block 360 where host packet controller 199 determines whether the train has reached the current optimum packet-length. This determination is done by checking the number-of-packets in the train against the optimum number-of-packets per train. If the determination at block 360 is true, then control continues to block 355, as previously described above. If the determination at block 360 is false, then control continues to block 365 where packet controller 119 determines whether the number-of-packets in the train is one. If the determination at block 365 is true, then control continues to block 370 where packet controller 119 starts timer 121, which will time out in a predetermined constant amount of time. Control then continues to block 375 where the function returns.

If the determination at block 365 is false, then control continues directly to block 375 where the function stops.

Figure 7:
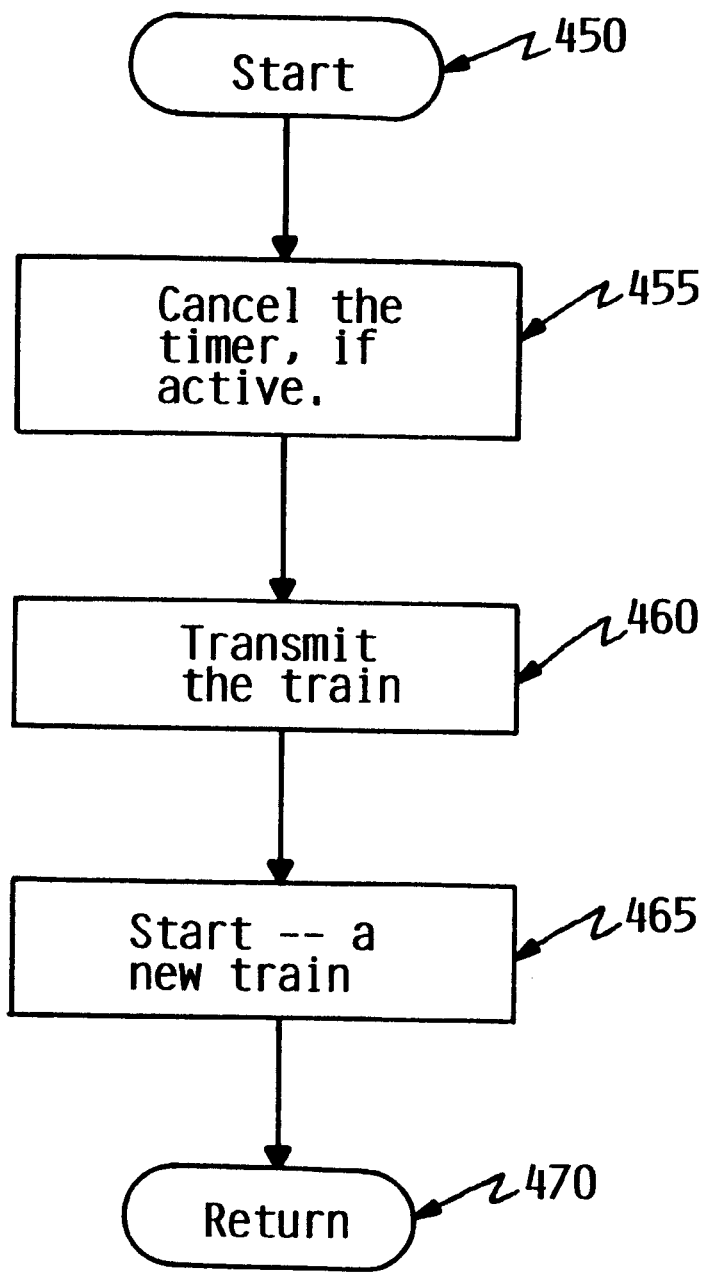

Referring to FIG. 7, there is illustrated sample logic that delivers the existing train and starts a new one. Control starts at block 450. At block 455, if timer 121 is active, then packet controller 119 cancels timer 121. At block 460, packet controller 119 transmits the current train to its destination. At block 465, packet controller 119 ends the current train and starts a new current train. At block 470, the logic returns.

Figure 8:
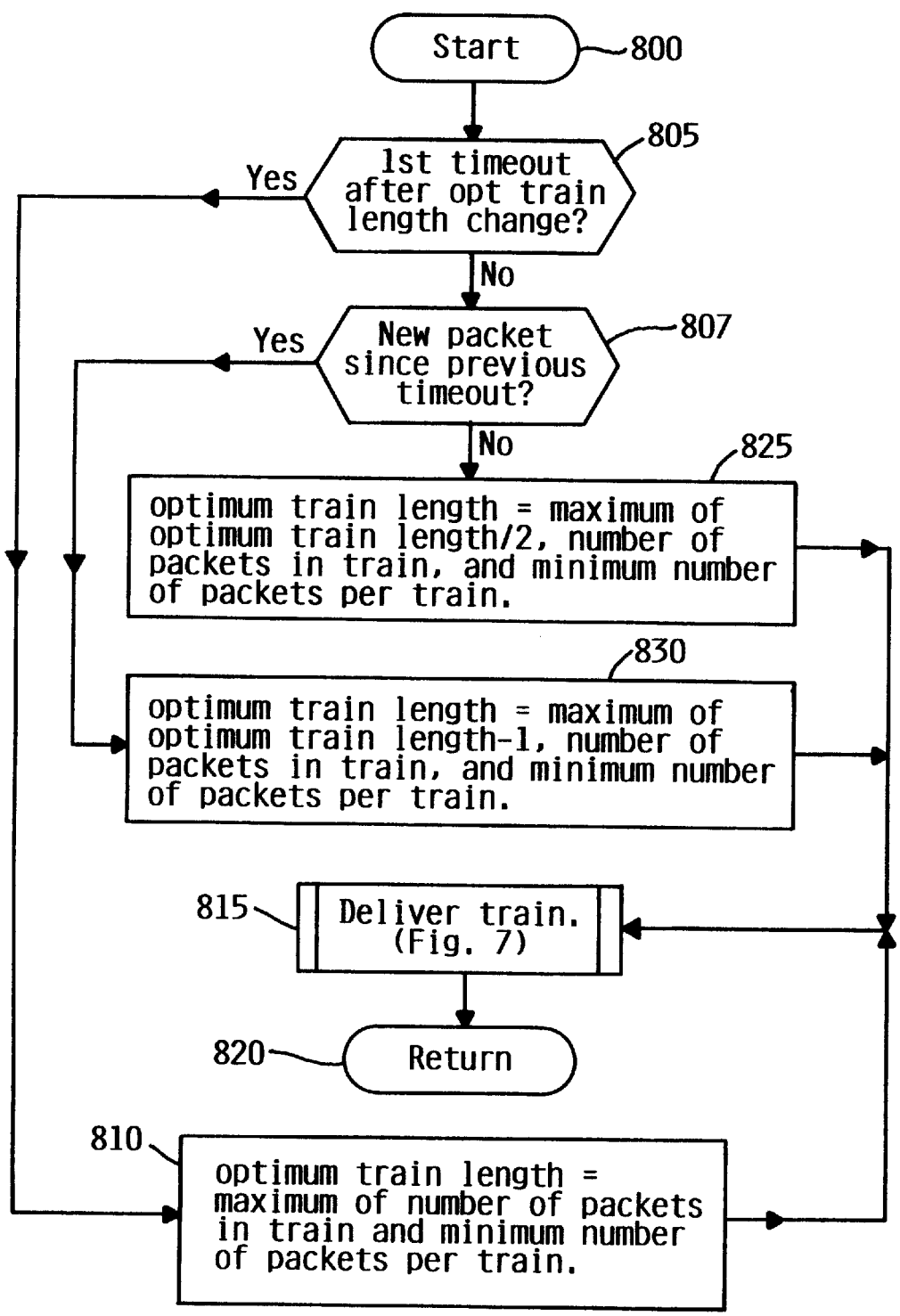

FIG. 8 shows the logic of packet controller 119 that is invoked when timer 121 expires. The logic is entered at block 800. Control then continues to block 805 where packet controller 119 determines whether this is the first timeout after the optimum number-of-packets per train was changed. If the determination at block 805 is true, then control continues to block 810 where packet controller 119 sets the optimum number-of-packets per train to be the maximum of the number-of-packets in the train and the minimum number-of-packets per train. Thus, the workload is dictating the number of packets that should be trained. Control then continues to block 815 where packet controller 119 delivers the current train, as further described above the description for FIG. 7. Referring again to FIG. 8, control then continues to block 820 where the function returns.

If the determination at block 805 is false, then control continues to block 807 where packet controller 119 determines whether a new packet has been received since the previous timeout. If the determination at block 807 is false, then control continues to block 825 where packet controller 119 sets the optimum number-of-packets in the train to be the maximum of the optimum train-length divided by two, the number-of-packets in the train, and the minimum number-of-packets per train. Control then continues to block 815 as previously described above.

If the determination at block 807 is true, then control continues to block 830 where packet controller 119 sets the optimum number-of-packets in the train to be the maximum of the optimum train-length minus one, the number-of-packets in the current train, and the minimum number-of-packets per train. Control then continues to block 815, as previously described above.

Figure 9:
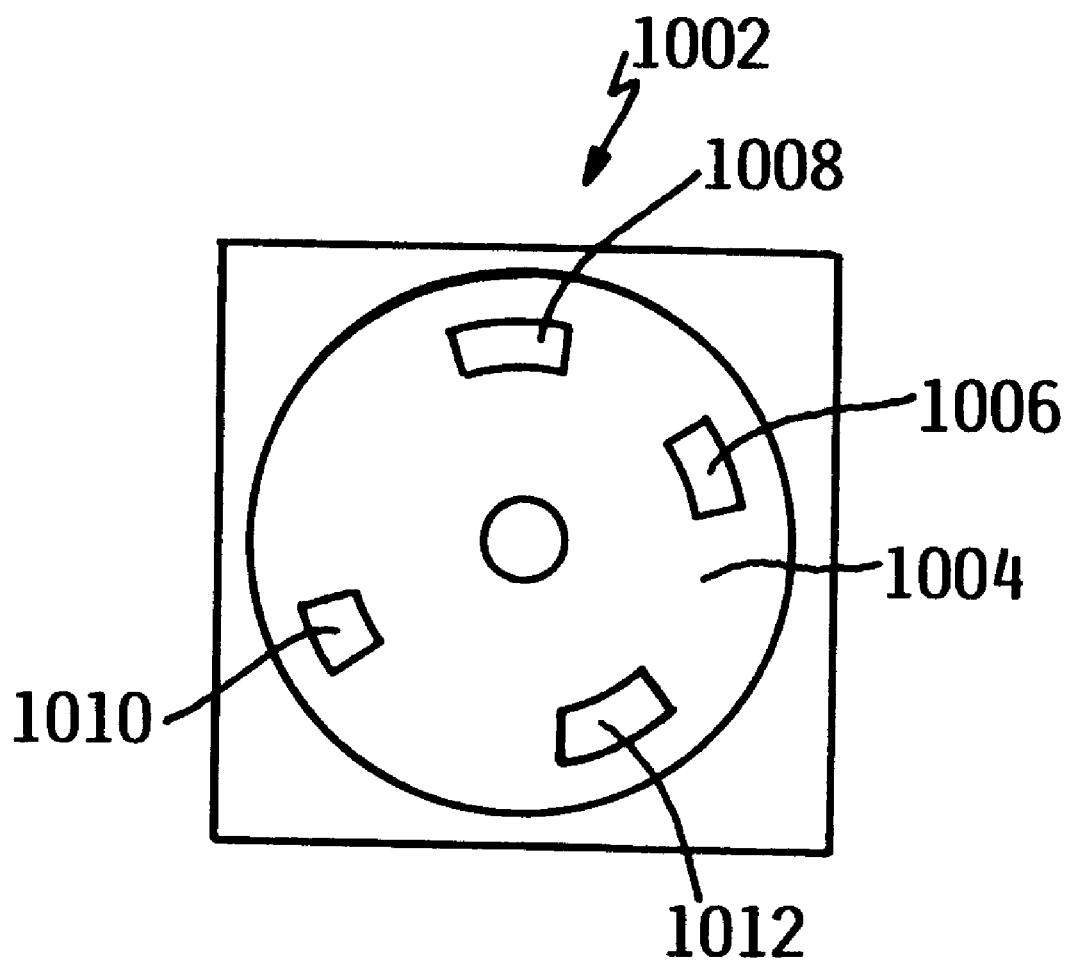
FIG. 9 depicts a block diagram of an article of manufacture or a computer program product including a storage medium for storing thereon program means for carrying out the packet controller, according to the preferred embodiment.

FIG. 9 shows an article of manufacture or a computer program product including a storage medium for storing thereon program means for carrying out the method of this invention in the node of FIG. 2. Referring again to FIG. 9, it is important to note that while the present invention has been described in the context of a computer system, that those skilled in the art will appreciate that the mechanisms of the present invention are capable of being distributed as a program product in a variety of forms, and that the present invention applies equally regardless of the particular type of signal-bearing media used to actually carry out the distribution. Examples of signal-bearing media include: recordable-type media such as floppy disks and CD-ROMs and transmission-type media such as digital and analog communications links, including wireless communications.

An example of such an article of manufacture is illustrated in FIG. 9 as pre-recorded floppy disk 1002. Floppy disk 1002 is intended for use with a computer system, and includes magnetic storage medium 1004, and program means 1006, 1008, 1010, and 1012 recorded thereon, which when executed by host processor 116 facilitate the practice of the method of this invention. It will be understood that such apparatus and articles of manufacture also fall within the spirit and scope of this invention.

These foregoing concepts are illustrated by the following pseudo-code. The following configurable constants are used.

maxDataPerTrain: Maximum amount of data per train, which in the preferred embodiment is larger than the maximum packet length.

minPacketsPerTrain: Minimum number of packets per train.

maxPacketsPerTrain: Maximum number of packets per train.

minPacketSize: Minimum size of packet.

t: Timer interval that the timer is set to.

Pi: Number of packets that define a sampling interval.

TiHiDelta: Interval delta percentage (highbound). This is a number greater than one.

TiLoDelta: Interval delta percentage (lowbound). This is number between zero and one.

The following variables are used by the pseudo code:

n: Dynamically adjustable, optimum number of packets per train, i.e., an adjustable, optimum train length.

Ts: Time at star to train.

Pc: Packet count.

TiHi: Interval time (highbound).

TiLo: Interval time (lowbound).

Ti: Current interval time.

Increased: Boolean indicating whether n was just increased.

Timeout: Boolean indicating if a timeout just occurred.

train: The object implementing the actual packet train.

```
Psuedo-code:
! Initialize the packet delivery support
initPacketDelivery;
    n=minPacketsPerTrain;        !Start out small
    TiHi=TiLo=( );               !Force calibration on next interval
    Pc=( );                      ! No packets have arrived yet
    train.new( );                ! Start a new train
end initPacketDelivery;
! Deliver existing train and start a new one
newTrain( );
    cancelTimer( );      ! Cancel deadman timer, if active
    train.transmit( );   ! Transmit the train
    train.new( );        ! Start a new train
end newTrain;
! Deadman timer function, entered upon deadman timer expiration
deadManTimer( );
    ! First timeout after a change in n?
    if increased then·! Yes, so calibrate n
        n=max(train.numberpackets( ), minPacketsPerTrain);
    else                              ! No, so backoff n
        do;
        ! Did we just take a timeout?
        if timeout then   ! Yes, so get n lower now!
            n=max (max(n/2, train.numberPackets( )), minPacketsPerTrain);
        else                          ! No, so slowly backoff n
            n=max (max(n-1, train.numberPackets( )), minPacketsPerTrain);
        end;
        increased=FALSE;     ! Didn't just increase
        timeout =TRUE;       ! Just took a timeout
        newTrain( );         ! Deliver the existing train
end deadManTimer;
! Packet delivery function
newPacket(p);
    increased=FALSE;     ! Assume no increase
    timeout =FALSE;      ! Didn't just have a timeout
    Pc =Pc+ 1;           ! Increment packet count
    ! Reached packet interval?
if Pc>=Pi then
    do;
        Pc=0;                    ! Reset packet count
        Ti=Ts;                   ! Save last interval start time
        getTime(Ts);             ! Capture new interval start time
        Ti=Ts-Ti;                ! Interval length
        ! Need to consider a change?
        if(n<maxPacketsPerTrain)
            do;
            ! Has packet rate changed significantly?
            if Ti>TiLo              ! Much slower
             | Ti<TiHi              ! or much faster?
                then                 ! Yes, so force calibration
                do;
                    n=maxPacketsPerTrain;
                    TiLo=Ti*TiLoDelta;
                    TiHi=Ti*TiHiDelta;
                    increased=TRUE;
                end;
            end;
end;
! Will packet fit in this train?
if train.dataSize( )<p.dsataSize( )
    then                          !No, so transrnit it now to avoid
                                  reordering data
        newTrain( );
    train.addToTrain(p);           ! Add packet to train
    Has this train reached it's maximum capacity?
    if    train.numberPackets( )=maxPacketsPerTrain
    |     (maxDataPerTrain-train.dataSize( ))>minPacketSize
    then                          ! Yes, so time for transmission
        newTrain( );
    else                          ! No, so continue
        do;
        ! Has the train reached the current packet limit?
        if train.numberPackets ( )=n
            then ! Yes, so force transmission
                newTrain( );
        ! Need to start a timer?
        else
            if train.numberPackets( )=1
            then             ! Yes, so do it now
                setTimer(deadManTimer( ),t);
    end;
end newPacket;
```

While this invention has been described with respect to the preferred and alternative embodiments, it will be understood by those skilled in the art that various changes in detail may be made therein without departing from the spirit, scope, and teaching of the invention. For example, although in the preferred embodiment, packet training is performed between host 103 (acting as a node), and communications packet control 106 in communications controller 101 (acting as a node), it is also possible that packet training could be performed between system 100 (acting as a node) and other systems in network 18, such as nodes 12, 28, 30, and 38. Accordingly, the herein disclosed invention is to be limited only as specified in the following claims.

What is claimed is:

1. At one node in a plurality of nodes, a method for packet training between the nodes, comprising the steps of:
    starting a timer to expire at a predetermined timer interval, wherein the timer interval comprises a maximum time to wait before sending a train of packets from the node;
    sampling a rate of packets arriving at the node;
    calculating a sampling interval, wherein the sampling interval comprises an elapsed time to receive a configurable-constant number of packets in the train; and
    dynamically adjusting an optimum number of packets sent from the node in the train based on a "predetermined percentage" a change in the sampling interval from a historic sampling-interval and expiration of the timer interval.

2. The method of claim 1, wherein the calculating step further composes:
    decreasing the sampling interval when the packet arrival-rate increases.

3. The method of claim 1, wherein the calculating step firer comprises:
    increasing the sampling interval when the packet arrival-rate decreases.

4. The method of claim 1, wherein the dynamically adjusting step further comprises:

only adjusting, the opium number of packets when the sampling interval changes significantly from a historic sampling-interval.

5. The method of claim 4, wherein the predetermined percentage change comprises a percentage greater or less than the historic sampling-interval.

6. The method of claim 1, further comprising:

when the timer interval expires, setting the optimum number-of-packets to be the number-of-packets accumulated prior to the timer interval expiration.

7. The method of claim 1, further comprising:

when the timer interval expires and the optimum train-length has not increased, lowering the optimum number-of-packets by an initial amount.

8. At one node in a plurality of nodes, a method for packet training between the nodes, comprising the steps of:

starting a timer to expire at a predetermined timer interval, wherein the timer interval comprises a maximum time to wait before sending a train of packets from the node;

sampling a rate of packets arriving at the node;

calculating a sampling interval, wherein the sampling interval comprises an elapsed time to receive a configurable-constant number of packets in the train; and dynamically adjusting an optimum number of packets sent from the node in the train based on the sampled rate of packets arriving at the node and the timer, when the timer interval expires and the optimum train-length has not increased, lowering the optimum number-of-packets by an initial amount, when the timer interval expires and back-to-back timeouts have occurred without a received packet, lowering the optimum number-of-packets by a second amount, wherein the second amount is more than the initial amount.

9. The method of claim 8, wherein the lowering step further comprises lowering the optimum number-of-packets only down to a current number-of-packets accumulated prior to the timer interval expiration.

10. A computer system, comprising:

a processor;

memory coupled to the processor; and a packet controller residing in the memory and executing on the processor, wherein the packet controller starts a timer to expire at a predetermined timer interval, wherein the timer interval comprises a maximum time to wait before sending a train of packets from the node, and wherein the packet controller samples a rate of packets arriving at the node, calculates a sampling interval, wherein the sampling interval comprises an elapsed time to receive a configurable-constant number of packets in the train, and wherein the packet controller dynamically adjusts an optimum number of packets sent from the node in the train based on a "predetermined percentage" change in the sampling interval from a historic sampling-interval and expiration of the timer interval.

11. The computer system of claim 10, wherein the packet controller further decreases the sampling interval when the packet arrival-rate increases.

12. The computer system of claim 10, wherein the packet controller further increases the sampling interval when the packet arrival-rate decreases.

13. The computer system of claim 10, wherein the packet controller further only adjusts the optimum number of packets when the sampling interval changes significantly from a historic sampling-interval.

14. The computer system of claim 13, wherein the predetermined percentage change comprises a percentage greater or less than the historic sampling-interval.

15. The computer system of claim 10, wherein the packet controller further sets the optimum number-of-packets to be the number-of-packets accumulated prior to the timer interval expiration.

16. The computer system of claim 10, wherein the packet controller further lowers the optimum number-of-packets by an initial amount when the timer interval expires and the optimum train-length has not increased.

17. A computer system, comprising:

a processor;

memory coupled to the processor; and a packet controller residing in the memory and executing on the processor, wherein the packet controller starts a timer to expire at a predetermined timer interval, wherein the timer interval comprises a maximum time to wait before sending a train of packets from the node, and wherein the packet controller samples a rate of packets arriving at the node, calculates a sampling interval, wherein the sampling interval comprises an elapsed time to receive a configurable-constant number of packets in the train, and wherein the packet controller dynamically adjusts an optimum number of packets sent from the node in the train based on the sampled rate of packets arriving at the node and the timer, wherein the packet controller further lowers the optimum number-of-packets by an initial amount when the timer interval expires and the optimum train-length has not increased, wherein the packet controller further lowers the optimum number-of-packets by a second amount, wherein the second amount is more than the initial amount when the timer interval expires and, back-to-back timeouts have occurred without a received packet.

18. The computer system of claim 17, wherein the packet controller further lowers the optimum number-of-packets only down to a current number-of-packets accumulated prior to the timer interval expiration.

19. A program product for use in a computer system, the computer program product being adapted for packet training between nodes, the computer program product comprising:

a packet controller that starts a timer to expire at a predetermined timer interval, wherein the timer interval comprises a maximum time to wait before sending a train of packets from the node, and wherein the packet controller samples a rate of packets arriving at the node, calculates a sampling interval, wherein the sampling interval comprises an elapsed time to receive a configurable-constant number of packets in the train, and wherein the packet controller dynamically adjusts an optimum number of packets sent from the node in the train based on a "predetermined percentage" change in the sampling interval from a historic sampling-interval and expiration of the timer interval; and signal-bearing media bearing the packet controller.

20. The program product of claim 19, wherein the packet controller further decreases the sampling interval when the packet arrival-rate increases.

21. The program product of claim 19, wherein the packet controller further increases the sampling interval when the packet arrival-rate decreases.

22. The program product of claim 19, wherein the packet controller further only adjusts the optimum number of packets when the sampling interval changes significantly from a historic sampling-interval.

23. The program product of claim 22, wherein the significant change comprises a predetermined percentage greater or less than the historic sampling-interval.

24. The program product of claim 19, wherein the packet controller further sets the optimum number-of-packets to be the number-of-packets accumulated prior to the timer interval expiration.

25. The program product of claim 19, wherein the packet controller further lowers the optimum number-of-packets by an initial amount when the timer interval expires and the optimum train-length has not increased.

26. A program product for use in a computer system, the computer program product being adapted for packet training between nodes, the computer program product comprising:

a packet controller that starts a timer to expire at a predetermined timer interval, wherein the timer interval comprises a maximum time to wait before sending a train of packets from the node, and wherein the packet controller samples a rate of packets arriving at the node, calculates a sampling interval, wherein the sampling interval comprises an elapsed time to receive a configurable-constant number of packets in the train, and wherein the packet controller dynamically adjusts an optimum number of packets sent from the node in the train based on the sampled rate of packets arriving at the node and the timer; and signal-bearing media bearing the packet controller, wherein the packet controller further lowers the optimum number-of-packets by an initial amount when the timer interval expires and the optimum train-length has not increased, wherein the packet controller further lowers the optimum number-of-packets by a second amount, wherein the second amount is more than the initial amount when the timer interval expires and back-to-back timeouts have occurred without a received packet.

27. The program product of claim 26, wherein the packet controller further lowers the optimum number-of-packets only down to a current number-of-packets accumulated prior to the timer interval expiration.

* * * * *

UNITED STATES PATENT AND TRADEMARK OFFICE
CERTIFICATE OF CORRECTION

PATENT NO. : 6,298,070 B1
DATED : October 2, 2001
INVENTOR(S) : David G. Carlson et al.

It is certified that error appears in the above-identified patent and that said Letters Patent is hereby corrected as shown below:

<u>Title page,</u>
ABSTRACT,
Line 5, "number-of-packetsito" should be -- number-of-packets to --.

<u>Column 10,</u>
Lines 56-57, ""predetermined percentage" a change" should be -- predetermined percentage change --.
Line 65, "firer" should read -- further --.

<u>Column 11,</u>
Line 3, "opium" should read -- optimum --
Line 7, "a percentage greater" should be -- a predetermined percentage greater --.
Line 58-59, ""predetermined percentage"" should be -- predetermined percentage --.

<u>Column 12,</u>
Line 6, "a percentage" should be -- a predetermined percentage --.
Line 58, ""predetermined percentage"" should be -- predetermined percentage --.

Signed and Sealed this

Eighteenth Day of June, 2002

*Attest:*

JAMES E. ROGAN
*Attesting Officer*     *Director of the United States Patent and Trademark Office*